Figure 1:
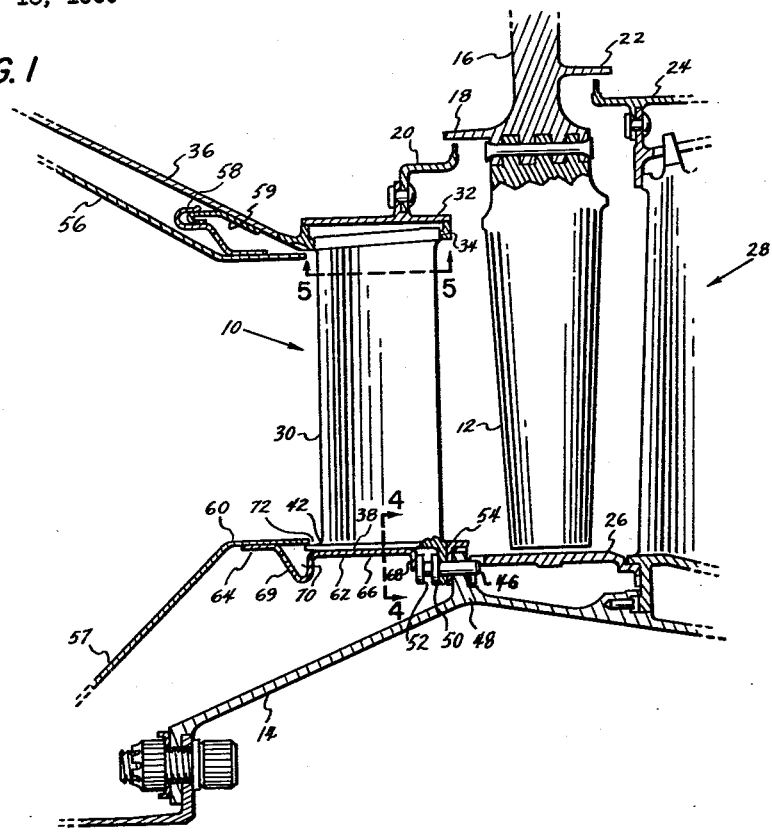

Nov. 6, 1962  C. J. PETERSON  3,062,499
VANE MOUNTING AND SEAL
Filed May 18, 1960  2 Sheets-Sheet 1

INVENTOR.
CHARLES J. PETERSON
BY *Teller and McCormick*
ATTORNEYS

United States Patent Office 3,062,499
Patented Nov. 6, 1962

3,062,499
VANE MOUNTING AND SEAL
Charles J. Peterson, North Palm Beach, Fla., assignor to United Aircraft Corporation, East Hartford, Conn., a corporation of Delaware
Filed May 18, 1960, Ser. No. 29,980
10 Claims. (Cl. 253—78)

This invention relates to axial flow power conversion machines, and deals more specifically with an improved mounting and seal for the nozzle guide vanes of such machines.

The nozzle vane mounting and seal construction with which this invention is concerned finds particular utility in, but is not necessarily limited to, turbines used in power plants which include, in addition to the turbines, axial flow compressors and combustion chamber means for providing high pressure gas as the motive fluid for the turbine. In such a power plant the compressor compresses a gas, usually air, in one or more stages and feeds it to the combustion chamber means where it is mixed with fuel and burned to produce thrust on the power plant and to further increase its pressure. The high pressure gas leaving the combustion chamber means enters an annular transition duct located between the combustion chamber means and the first stage nozzle ring of the turbine and from there flows through the nozzle ring and the other parts of the turbine, the duct generally providing a full admission inlet for the nozzle ring.

The vanes of the first stage nozzle ring are the first active elements of the turbine to engage the hot gas produced in the combustion chamber means, and therefore, in service, generally achieve the highest temperatures of any of the turbine parts. Consequently, these vanes are generally the parts most likely to become burnt, eroded or otherwise damaged and are oftentimes found to require frequent replacement. Therefore, it is common practice to make the vanes removable from their mounting structure, but all of the previously proposed constructions for providing such removability have required a considerable amount of time-consuming engine dismantling and other work to replace a vane. One reason for the difficulty in providing a suitable replaceable vane construction has been the necessity of providing, at the same time, a relatively tight seal between the vanes and the transition or inlet duct to prevent the leakage of gas from its intended path through the nozzle ring.

The primary object of this invention, therefore, is to provide an improved vane and mounting construction for the nozzle ring vanes of an axial flow machine which construction facilitates the removal and replacement of individual vanes comprising the nozzle ring.

Another object of this invention is to provide an improved nozzle vane and mounting construction which, in addition to facilitating the removal and replacement of individual vanes, further serves to provide a tight seal adjacent the outer ends of the vanes and between the vanes and the inlet or transition duct to prevent the loss of motive power by the escape of high pressure gas from its intended path through the nozzle ring.

Another object of this invention is to provide an improved vane and mounting construction particularly adapted for use in the first stage nozzle ring of an axial flow turbine having an annular inlet duct and wherein the inlet duct means forms a part of the seal for the nozzle ring and also a part of the vane mounting means so as to reduce the number of parts required in the turbine, and said construction further providing a novel cooperation between the inlet duct means and the other parts of the vane mounting whereby all of the vanes of the nozzle ring are made readily and individually removable from the turbine, without the necessity of extensive dismantling, by the removal of the outer duct ring.

Still further objects of the invention will be apparent from the drawing and from the following description.

The drawings show a preferred embodiment of the invention and such embodiment will be described, but it will be understood that various changes may be made from the constructions disclosed, and that the drawings and description are not to be construed as defining or limiting the scope of the invention, the claims forming a part of this specification being relied upon for that purpose.

Figure 2:
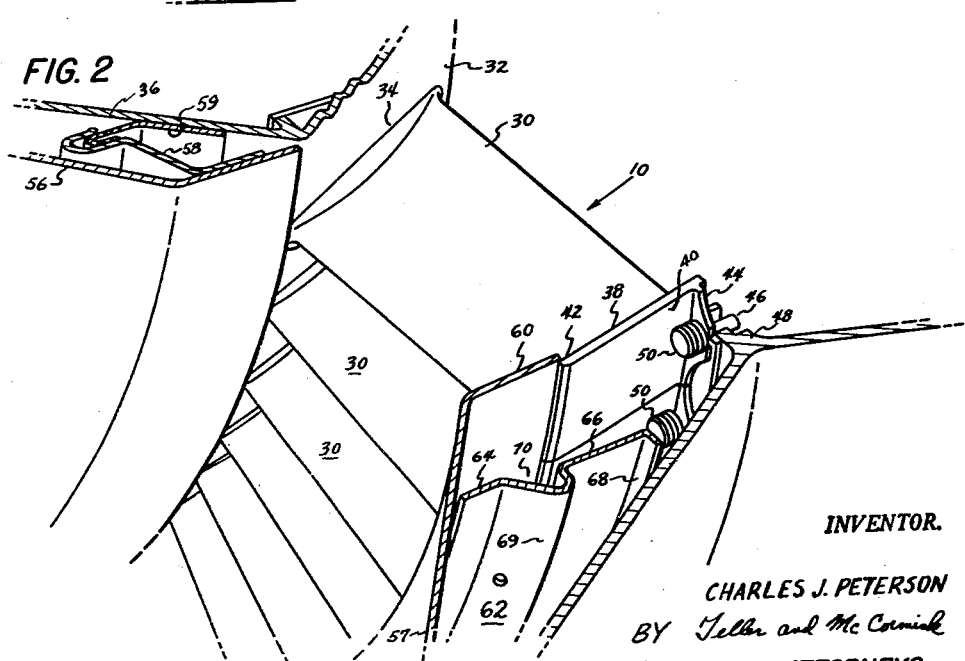
Figure 3:
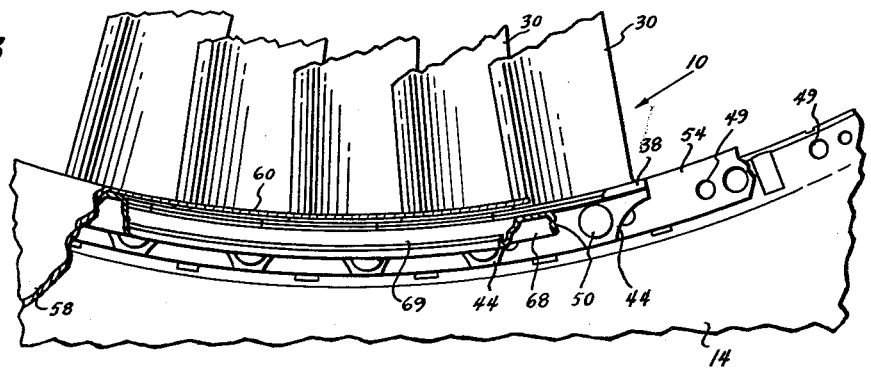
Figure 4:
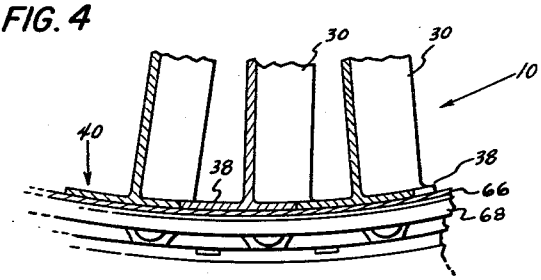
Figure 5:
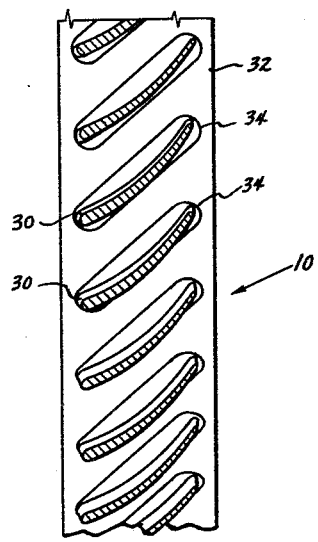

Of the drawings:

FIG. 1 is a fragmentary longitudinal sectional view taken through a turbine embodying this invention, the view being taken in the region of the first stage nozzle ring of the turbine, FIG. 2 is a fragmentary perspective view of a portion of the turbine structure shown in FIG. 1, FIG. 3 is a fragmentary sectional view showing the lower ends of the first stage nozzle vanes of FIG. 1 and the associated mounting and seal structure, the left-hand portion of the view being taken on a plane located some distance upstream from the first stage nozzle vanes of FIG. 1 and with the parts of the mounting and seal structure being progressively broken away to greater axial depths in going from the left to the right of the view to reveal other parts of the mounting and seal structure, FIG. 4 is a fragmentary transverse sectional view taken on the line 4—4 of FIG. 1, and FIG. 5 is a fragmentary sectional view through the first stage nozzle vanes taken on the line 5—5 of FIG. 1.

In the drawings, wherein there is shown a preferred embodiment of this invention, and first particularly referring to FIGS. 1 and 2, the reference character 10 indicates the first stage nozzle ring of an axial flow turbine. This ring serves to guide the motive fluid into proper power-converting relationship with the first stage turbine blades, one of which is shown at 12 in FIG. 1. The nozzle ring 10 is stationary with respect to the casing 14, while the turbine blades 12 are mounted on a disc 16 that rotates about a central horizontal axis located some distance above the structure shown in FIG. 1. On its upstream side, the turbine disc 16 is provided with an annular sealing flange 18 that cooperates with an annular sealing finger 20, while the downstream side of the disc 16 is provided with a similar annular sealing flange 22 that cooperates with an annular sealing finger 24. Surrounding the outer ends of the turbine blades 12 is an annular seal 26. After leaving the first stage turbine blades, the motive fluid enters the second stage nozzle ring, indicated generally at 28 in FIG. 1, and then flows axially through other parts of the turbine and other parts of the power plant with which the turbine is associated.

For an example of a power plant with which the turbine structure of FIGS. 1 and 2 may be associated, reference is made to Patent No. 2,747,367 to B. S. Savin, Jr., issued May 29, 1956, which patent shows a power plant that includes an axial flow compressor and combustion chamber means for supplying the motive fluid to the turbine.

The subject matter of this invention, however, it not necessarily limited to this particular type of power plant and may be used with other types. And, in fact, some of the broader aspects of the invention, as described and claimed below, are not limited to turbines but extend as well to axial flow compressors and other axial flow power conversion machines.

In accordance with the invention, the nozzle ring 10 comprises a plurality of vanes 30, 30 arranged in a circumferentially spaced annular series about the central axis of the turbine. The inner or root ends of the vanes 30, 30 are supported by the annular retaining ring or support member 32 which, as best shown in FIGS. 1 and 5, is provided with a plurality of circumferentially spaced openings 34, 34. The root ends of the vanes 30, 30 conform in size and shape to the openings 34, 34 and are slidably received thereby so as to be restrained against axial and circumferential displacement while being free to move radially with respect to the retaining ring. This freedom of the vanes 30, 30 to move radially with respect to the retaining ring 32 allows them to compensate for changes in their lengths due to temperature changes and also permits the vanes to be easily moved out of and into assembled relationship with the retaining ring during the removal or replacement of a vane. In the illustrated case, the retaining ring 32 is supported by an annular supporting ring 36 which is fastened at its inner end to another part or parts, not shown, of the power plant.

At their radially outer ends, the vanes 30, 30 are provided with shrouds 38, 38 which extend circumferentially and axially of the associated vanes. As shown best in FIG. 4, one shroud 38 is formed on the outer end of each vane 30 and each shroud abuts the two shrouds 38, 38 located on either side of it so that the shrouds of all the vanes collectively define a substantially continuous shroud ring 40 around the outer ends of the vanes which serves to prevent the flow of motive fluid radially outwardly with respect to the vanes. The outer face of the shroud ring 40 is substantially cylindrical and concentric with the central axis of the turbine. As shown best in FIG. 1, the shrouds 38, 38 extend or project some distance upstream beyond the leading edges of the vane bodies so as to collectively define an annular sealing rib 42 which serves a purpose hereinafter described.

To support the outer ends of the vanes 30, 30, each of the vanes is provided with a radially outwardly extending flange 44 which is located adjacent the downstream side of the vane and in a plane normal to the central axis of the nozzle ring. The vane flanges 44, 44 are each provided with an axially extending opening which slidably receives a locking pin 46 that extends through the flange and into a fixed annular mounting or support member so as to restrain the outer ends of the vanes against radial and circumferential displacement. It is contemplated that the annular mounting or support member for receiving the locking pins 46, 46 may take various forms; however, it preferably, as shown in FIGS. 1, 2 and 3, comprises a radially inwardly extending mounting flange 48 provided on the turbine casing 14, which casing surrounds the nozzle ring 10 in radially spaced relation to the shroud ring 40. The mounting flange 48 is located axially downstream from the vane flanges 44, 44 and is positioned in axially opposing relationship therewith. The pins 46, 46 are axially slidable with respect to the vane flanges 44, 44 and are also slidable with respect to the mounting flange 48 so that they may be easily removed from and replaced in connecting relationship with the vane flanges and the mounting flange. The mounting flange is, of course, provided with a series of circumferentially spaced holes 49, 49 for receiving the pins 46, 46, as shown best in FIG. 3.

On their upstream ends the pins 46, 46 are provided with heads 50, 50 having shoulders which engage the vane flanges 44, 44 to limit the axial movement of the pins in a downstream direction. Other means may be employed for limiting the downstream movement of the pins 46, 46 without departing from the invention, but when the heads 50, 50 are used, it is preferred that each head be provided with an annular groove 52, as shown in FIG. 1, to which a tool may be applied for removing or replacing the associated pin. Between the downstream faces of the vane flanges 44, 44 and the upstream face of the mounting flange 48 is a seal ring 54, FIGS. 1 and 3, which is also provided with openings through which the pins 46, 46 pass.

The inlet or transition duct for supplying motive fluid to the nozzle ring 10 includes, as shown in FIGS. 1 and 2, an inner annular duct ring 56 and an outer annular duct ring 57 which together define an annular full admission inlet path for the motive fluid. The downstream end of the inner annular duct ring 56 is connected with the supporting ring 36 by a pair of cooperating annular connecting rings 58 and 59, as shown in FIGS. 1 and 2, and its upstream end is connected with another part or parts of the power plant, not shown. The outer annular duct ring 57 is slidably supported by the nozzle ring at its downstream end, as hereinafter described, and at its upstream end is supported by and connected with another part or parts, not shown, of the power plant in a conventional manner, the upstream end of the duct ring 57 being disconnectible from said part or parts to permit it to be moved axially upstream from the position shown in FIG. 1.

In further accord with the invention, the outer annular duct ring 57 has associated therewith means for providing a seal between itself and the shroud ring and for holding the locking pins 46, 46 in place with respect to the vane flanges 44, 44 and the mounting flange 48. This means includes an inner annular sealing ring 60 which engages the inner face of the upstream projecting shroud rib 42. The sealing ring 60 is connected with the outer duct ring 57 and is preferably integral therewith, as shown in FIG. 1, so as to comprise the downstream end portion of the ring 57. Also included in the sealing means is an outer sealing ring 62 which has an upstream portion 64 connected with the inner sealing ring 60 at a location spaced upstream from the sealing rib 42. The outer ring 62 further includes a downstream portion 66 which surrounds and engages the outer face of the shroud ring 40, and the outer face of the shroud rib 42, and which extends a major portion of the axial length of the shroud ring. At its downstream end, the ring portion 66 is bent radially outwardly to define an abutment flange 68 which engages or abuts the heads 50, 50 of the pins 46, 46 to hold the latter in place.

Between its upstream and downstream portions 64 and 66, respectively, the outer sealing ring 62 has a U-shaped intermediate portion 69 which, with the inner sealing ring 60, defines an annular chamber 70 having a downstream facing mouth 72 which receives the shroud rib 42. Thus, the outer annular duct ring 57 is supported on the shroud ring 40 and the rib 42 and the cooperation of the sealing rings 60 and 62 is such that a generally labyrinth type seal is provided between the outer duct ring 57 and the shroud ring 40, which seal effectively prevents the escape of motive fluid between the outer duct ring and the nozzle ring.

As previously mentioned, the annular abutment flange 68 of the outer sealing ring 62 engages the heads 50, 50 of the pins 46, 46 to hold them axially in place and in connecting relationship with the vane flanges 44, 44 and the mounting flange 48. The flange 68 preferably extends along the entire periphery of the shroud ring so as to simultaneously engage all of the pin heads 50, 50. To remove or replace any of the vanes 30, 30, the outer duct ring 57 is disconnected from the structure supporting its upstream end and is then moved or slid axially in the upstream direction to a point at which the outer sealing ring 62 is moved entirely out of engagement with the shroud ring 40, it being noted that the connection between the shroud ring 40 and the outer annular duct ring 57 is such as to permit a relative sliding movement therebetween. This upstream movement of the outer duct ring simultaneously frees all of the locking pins 46, 46 from engagement with the flange 68 so that they may be pulled axially upstream and out of the mounting flange 48 and their associated vane flanges 44, 44 to disconnect the vanes from the mounting flange. After its locking pin is removed, the associated vane is readily removed from the turbine by moving it radially out of its opening 34 in the inner retaining ring 32. A new vane may then be substituted for the one removed and readily installed in the nozzle ring by following the reverse procedure of first fitting its inner end in the opening 34 of the inner retaining ring and then connecting its outer end to the mounting flange 48 by inserting the pin 46. After all of the vanes requiring replacement are removed and replaced with new vanes in this manner, the outer annular duct ring 57 is returned to the position shown in FIG. 1 to hold all of the pins 46, 46 in place. Therefore, it is seen that by simply sliding the outer duct ring 57 upstream, which is generally a relatively easy operation, all of the vanes 30, 30 are conditioned for individual removal and replacement without the necessity of any further engine dismantling.

The invention claimed is:

1. The combination in an axial flow power conversion machine of, a nozzle ring comprising a plurality of vanes arranged in a circumferentially spaced annular series about a central axis and having shrouds on their radially outer ends which shrouds collectively define a substantially continuous shroud ring having a cylindrical outer surface concentric with said central axis and having an annular rib which projects upstream beyond the leading edges of said vanes, means fixed relative to said central axis for supporting the outer ends of said vanes adjacent the downstream sides thereof, an annular inlet duct means surrounding said central axis and located generally upstream of said nozzle ring for supplying motive fluid to said nozzle ring, and means on the downstream end of said duct means and engageable with said shroud ring to provide a seal between said duct means and said shroud ring, said last mentioned means including an inner annular sealing ring which engages the inner face of said projecting shroud rib and also including an outer annular sealing ring which engages and surrounds the outer face of said shroud rib, said outer annular sealing ring being of such axial length as to engage and surround the outer face of said shroud ring and to extend axially for the major portion of the axial length of said shroud ring.

2. The combination in an axial flow power conversion machine of, a nozzle ring comprising radially spaced inner and outer annular vane support members, a plurality of vanes arranged in a circumferentially spaced annular series between said two support members, the inner ends of said vanes being slidably connected with said inner support member for movement of said vanes in radial directions relative to said latter member during assembly and disassembly of said vanes therewith, means including a plurality of pins each passing axially through the outer end of a respective one of said vanes and into a corresponding opening in said outer support member for connecting the said vanes to said outer support member and which pins are slidable axially in one direction to disconnect the associated vanes from said outer support member and a single means located adjacent the outer ends of said vanes and associated with all of said pins for normally holding said pins in connected relationship with said vanes and said outer support member but which means is movable with respect to said outer vane support member to simultaneously free all of said pins for individual axial sliding movement to disconnect said vanes from said outer support member.

3. The combination in an axial flow power conversion machine of, a plurality of guide vanes arranged in a circumferentially spaced annular series about a central axis and having radially outwardly extending flanges on their radial outer end portions which flanges are disposed in a common plane normal to said central axis, a mounting member surrounding and fixed relative to said central axis and located in axially opposed relationship to said vane flanges, a plurality of locking pins associated one with each of said vane flanges and passing axially through said vane flanges and into said mounting member to restrain the outer end portions of said vanes against radial and circumferential displacement relative to said mounting member, the said pins being axially slidable in one direction relative to said vane flanges and mounting member for removal therefrom and having means for limiting their movement in the other direction, and an abutment means located adjacent the outer ends of said vanes, said abutment means being movable relative to the outer ends of said vanes between a first position at which it simultaneously engages all of said locking pins to hold the latter pins in place with respect to said vane flanges and mounting member and a second position at which it is displaced from said locking pins to free said pins for removal from said vane flanges and mounting ring.

4. The combination in an axial flow power conversion machine of, a plurality of guide vanes arranged in a circumferentially spaced annular series about a central axis and having radially outwardly extending flanges on their radially outer end portions which flanges are disposed in a common plane normal to said central axis, a casing surrounding and spaced from the outer end portions of said vanes and having a mounting flange thereon which flange extends radially inwardly from said casing into axially opposed relation to said vane flanges, a plurality of locking pins associated one with each of said vane flanges and passing axially through said vane flanges and into said mounting flange to restrain the outer end portions of said vanes against radial and circumferential displacement relative to said mounting flange, the said pins being axially slidable in one direction relative to said vane and mounting flanges for removal therefrom and having heads thereon providing shoulders for limiting their movement in the other direction, and a member surrounding at least a portion of said annular series of vanes and having an abutment thereof engageable with the heads of the locking pins associated with the vanes comprising said portion of the annular series of vanes to hold the latter pins in place with respect to said vane and mounting flanges, the said member being movable relative to said casing between a first position at which said abutment engages the heads of said latter locking pins to hold the same in place with respect to said vane and mounting flanges and a second position at which said abutment is spaced from the associated pin heads to free said pins for removal from said vane and mounting flanges.

5. The combination in an axial flow gas turbine of, a plurality of nozzle guide vanes arranged in a circumferentially spaced annular series about a central axis and having shrouds that collectively define a substantially closed shroud ring about the outer ends of said vanes, flanges on said vanes which flanges extend radially outwardly from said shrouds and which flanges are located in a common plane normal to said central axis at some distance downstream from the leading edges of said vanes, a casing surrounding and spaced outwardly from said shroud ring and having a mounting flange thereon located downstream of said vane flanges and which mounting flange extends radially inwardly from said casing into axially opposed relation to said vane flanges, a plurality of locking pins associated one with each of said vane flanges and passing through said vane flanges and into said mounting flange to restrain the outer end portions of said vanes against radial and circumferential displacement relative to said mounting flange, the said pins being axially slidable relative to said vane and mounting flanges and having means for limiting their movement in the downstream direction, and an annular member fixed relative to said central axis which member engages and surrounds at least a portion of the outer face of said shroud ring and which member extends downstream into engagement with said locking pins with the result that said pins are prevented from moving upstream and are held in place with respect to said vane flanges and said mounting flange.

6. The combination defined in claim 5 further characterized by means including an outer annular duct ring for defining an annular inlet duct for supplying motive fluid to said series of nozzle guide vanes, and the said annular member being connected with said outer annular duct ring.

7. The combination in an axial flow gas turbine of, a plurality of guide vanes arranged in a circumferentially spaced annular series about a central axis, each of said vanes having a shroud adjacent its outer end portion which projects upstream from the leading edge of the vane body and each vane further having a flange extending radially outwardly from the outer face of the associated vane shroud at a location spaced some distance downstream from the leading edge of the vane body, the flanges of said vanes being located in a common plane normal to said central axis, an annular mounting member fixed relative to said central axis and located downstream of said vane flanges and in axially opposed relationship therewith, a plurality of locking pins associated one with each of said vane flanges and passing axially through said vane flanges and into said mounting member to restrain the outer portions of said vanes against radial and circumferential displacement relative to said mounting member, said pins being slidable axially in the upstream direction relative to said vane flanges and mounting member for removal therefrom and having heads on their upstream ends which heads engage said vane flanges to limit the downstream movement of said pins, an inner annular seal ring fixed relative to said central axis and located generally upstream from said annular series of vanes and engaging the radially inner faces of the upstream projecting portions of said vane shrouds, and an outer annular seal ring fixed to said inner annular seal ring and extending downstream therefrom, said outer annular seal ring engaging the outer faces of said shrouds so that said shrouds are clamped between said inner and outer rings, and said outer ring having an abutment on its downstream end which abutment engages the heads of said pins to hold the latter in place.

8. The combination in an axial flow gas turbine of, a plurality of guide vanes arranged in a circumferentially spaced annular series about a central axis, said vanes having shrouds on their respective outer ends which shrouds have projections that extend upstream some distance from the leading edges of the associated vane bodies, the said vanes further having flanges extending radially outwardly from the outer faces of said shrouds at a location spaced some distance downstream from the leading edge of the vane bodies, there being one such shroud and one such flange associated respectively with each vane and the flanges of said vanes being arranged in a common plane normal to said central axis, an annular mounting member fixed relative to said central axis and located downstream of said vane flanges and in axially opposed relationship therewith, a plurality of locking pins associated one with each of said vane flanges and passing axially through said vane flanges and into said mounting member to restrain the outer portions of said vanes against radial and circumferential displacement relative to said mounting member, said pins being slidable axially in the upstream direction relative to said vane flanges and mounting member for removal therefrom and having heads on their upstream ends which heads engage the vane flanges to limit the downstream movement of said pins, an inner annular sealing ring fixed relative to said central axis and having an outer face which engages the inner faces of said shroud projections and which ring extends upstream some distance beyond the upstream ends of said projections, and an outer annular sealing ring having an upstream portion connected with said inner ring at a location spaced upstream from the upstream ends of said shroud projections and a downstream portion having an inner face which engages and surrounds the outer faces of said shrouds, said outer annular sealing ring also having an intermediate portion between said upstream and said downstream portions which intermediate portion is generally U-shaped in longitudinal cross section so as to define with said inner sealing ring an annular chamber adjacent the upstream ends of said shroud projections with the chamber having a downstream facing mouth that receives said shroud projections, the said downstream portion of said outer sealing ring also having a radially outwardly extending flange on its downstream end which flange engages the heads of said locking pins to hold said pins in place with respect to said vane mounting flanges and said mounting member.

9. The combination in an axial flow gas turbine of a nozzle ring comprising a plurality of vanes arranged in a circumferentially spaced annular series about a central axis and having shrouds on their radially outer ends which shrouds collectively define a substantially continuous shroud ring having a cylindrical outer surface concentric with said central axis and having an annular rib which projects upstream beyond the leading edges of said vanes, the said vanes further having flanges that extend radially outwardly from the outer faces of said shrouds at a location spaced some distance downstream from the leading edge of the vane bodies, there being one such shroud and one such flange associated respectively with each vane and the flanges of said vanes being arranged in a common plane normal to said central axis, a casing surrounding and spaced radially outwardly from said shroud ring and having a radially inwardly extending mounting flange thereon located downstream of and in axially opposed relationship with said vane flanges, a plurality of locking pins associated one with each of said vane flanges and passing axially through said vane flanges and into said mounting flange to restrain the outer portions of said vanes against radial and circumferential displacement relative to said mounting flange, said pins being slidable axially in the upstream direction relative to said vane flanges and mounting flange for removal therefrom and having heads on their upstream ends which heads engage the vane flanges to limit the downstream movement of said pins, means defining an annular inlet duct fixed relative to said central axis for supplying motive fluid to said nozzle ring which means includes an outer annular duct ring having an annular downstream end portion that engages the inner face of said shroud rib, and an outer annular sealing ring having an upstream portion connected with said duct ring at a location spaced upstream from said shroud rib and having a downstream portion which engages and surrounds the outer face of said shroud ring, said outer annular sealing ring also having an intermediate portion between the upstream and downstream portions thereof which intermediate portion is generally U-shaped in longitudinal cross section so as to define with said duct ring an annular chamber adjacent the upstream end of said shroud rib having a downstream facing mouth that receives said shroud rib, the said downstream portion of said outer sealing ring also having a radially outwardly extending flange on its downstream end which flange engages the heads of said locking pins to hold said pins in place with respect to said vane flanges and said mounting flange.

10. The combination defined in claim 1 further characterized by means fixed relative to said central axis for supporting the inner ends of said vanes for movement of said inner ends in radial directions relative to said central axis.

References Cited in the file of this patent

UNITED STATES PATENTS

| | | |
|---|---|---|
| 2,488,867 | Judson | Nov. 22, 1949 |
| 2,628,067 | Lombard | Feb. 10, 1953 |
| 2,801,075 | Broffitt | July 30, 1957 |
| 2,847,185 | Petrie et al. | Aug. 12, 1958 |
| 2,849,209 | Burgess et al. | Aug. 26, 1958 |
| 2,891,382 | Broffitt | June 23, 1959 |
| 2,937,000 | Ledwith | May 17, 1960 |
| 2,955,800 | Miller et al. | Oct. 11, 1960 |
| 2,984,454 | Fiori | May 16, 1961 |
| 2,999,670 | Payne et al. | Sept. 12, 1961 |

FOREIGN PATENTS

| | | |
|---|---|---|
| 551,286 | Canada | Jan. 7, 1958 |
| 1,202,356 | France | July 20, 1959 |